(12) United States Patent
Chun et al.

(10) Patent No.: US 10,867,749 B2
(45) Date of Patent: Dec. 15, 2020

(54) MULTILAYER CAPACITOR

(71) Applicant: SAMSUNG ELECTRO-MECHANICS CO., LTD., Suwon-si (KR)

(72) Inventors: Jin Sung Chun, Suwon-si (KR); Hae Suk Chung, Suwon-si (KR); Kyeong Jun Kim, Suwon-si (KR); Byung Sung Kang, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/171,972

(22) Filed: Oct. 26, 2018

(65) Prior Publication Data

US 2020/0027660 A1 Jan. 23, 2020

(30) Foreign Application Priority Data

Jul. 19, 2018 (KR) .................. 10-2018-0083975

(51) Int. Cl.
*H01G 4/12* (2006.01)
*H01G 4/30* (2006.01)
(Continued)

(52) U.S. Cl.
CPC .......... *H01G 4/1272* (2013.01); *H01G 4/008* (2013.01); *H01G 4/012* (2013.01); *H01G 4/1227* (2013.01); *H01G 4/232* (2013.01); *H01G 4/30* (2013.01)

(58) Field of Classification Search
CPC .......... H01G 4/005; H01G 4/08; H01G 4/012; H01G 4/12; H01G 4/30; H01G 4/232; H01G 4/248; H01G 4/1227
See application file for complete search history.

(56) References Cited

U.S. PATENT DOCUMENTS 5,835,339 A * 11/1998 Sakamoto ............... H01G 4/30
361/321.2
6,342,712 B1 * 1/2002 Miki ....................... H01L 28/60
257/295
(Continued)

FOREIGN PATENT DOCUMENTS

JP 3940176 B2 7/2007
JP 5087189 B2 11/2012
(Continued)

OTHER PUBLICATIONS

Office Action issued in corresponding Korean Application No. 10-2018-0083975, dated Jun. 27, 2019.

*Primary Examiner* — Dion Ferguson
(74) *Attorney, Agent, or Firm* — Morgan, Lewis & Bockius LLP

(57) ABSTRACT

A multilayer capacitor includes a capacitor body, a first external electrode, and a second external electrode. The capacitor body includes a plurality of first and second internal electrodes alternately stacked with dielectric layer interposed therebetween. The first and second external electrodes are electrically connected to the first and second internal electrodes, respectively. A first Schottky layer is Schottky-junctioned to an interface between the dielectric layer and the first internal electrode in the capacitor body. A second Schottky layer is Schottky-junctioned to an interface between the dielectric later and the second internal electrode in the capacitor body. The work function values of the first and second Schottky layers is higher than the work function values of the first and second internal electrodes.

23 Claims, 5 Drawing Sheets

(51) Int. Cl.
*H01G 4/008* (2006.01)
*H01G 4/012* (2006.01)
*H01G 4/232* (2006.01)

(56) References Cited

U.S. PATENT DOCUMENTS

| | | | | |
|---|---|---|---|---|
| 8,087,136 B2* | 1/2012 | Ito | ............................ | H01G 4/08 |
| | | | | 29/25.42 |
| 9,012,298 B2* | 4/2015 | Malhotra | ................ | H01L 28/56 |
| | | | | 438/396 |
| 9,142,353 B2* | 9/2015 | Bultitude | ................. | H01G 2/14 |
| 2005/0214517 A1* | 9/2005 | Sugimoto | ............... | B32B 18/00 |
| | | | | 428/209 |
| 2011/0095397 A1* | 4/2011 | Chung | ............. | H01L 21/02183 |
| | | | | 257/532 |
| 2013/0044404 A1* | 2/2013 | Chen | .................. | H01L 21/3141 |
| | | | | 361/301.4 |
| 2013/0258545 A1* | 10/2013 | Yano | ........................ | H01G 4/33 |
| | | | | 361/301.4 |
| 2014/0080283 A1* | 3/2014 | Song | ................. | H01L 21/02362 |
| | | | | 438/396 |
| 2015/0228408 A1* | 8/2015 | Koutsaroff | .............. | C23C 14/34 |
| | | | | 361/305 |
| 2016/0268045 A1* | 9/2016 | Kaneko | .................... | H01G 4/30 |
| 2017/0069863 A1* | 3/2017 | Kato | ..................... | H05B 33/14 |
| 2017/0260046 A1* | 9/2017 | Hwang | ................. | H05K 3/3442 |
| 2018/0068795 A1 | 3/2018 | Park et al. | | |
| 2018/0174756 A1* | 6/2018 | Shin | ................... | C04B 35/63424 |
| 2019/0244757 A1* | 8/2019 | Kwon | .................... | B32B 18/00 |
| 2019/0333699 A1* | 10/2019 | Lee | ........................ | C01B 32/182 |

FOREIGN PATENT DOCUMENTS

KR 10-0938554 B1 1/2010
KR 10-2018-0028237 A 3/2018

* cited by examiner

MULTILAYER CAPACITOR

CROSS-REFERENCE TO RELATED APPLICATION(S)

This application claims benefit of priority to Korean Patent Application No. 10-2018-0083975 filed on Jul. 19, 2018 in the Korean Intellectual Property Office, the disclosure of which is incorporated herein by reference in its entirety.

BACKGROUND

1. Field

The present disclosure relates to a multilayer capacitor.

2. Description of Related Art

A multilayer capacitor is as a general passive component and includes dielectric layers, internal electrodes, and external electrodes.

Recently, multilayer capacitors have required increased capacitance while retaining the same size as existing multilayer capacitors, and have required thinned dielectric layers and internal electrodes, atomized dielectric particles, and the like.

For example, to increase the capacitance of multilayer capacitors, dielectric layers and internal electrodes are laminated in an amount of a few hundred layers, in recent high-end products, and high capacitance is realized through high integration using dielectric layers with thicknesses of 1 μm or less.

However, thinning and atomization of dielectric layers increases insulation resistance.

Thinning and atomizing dielectric layers increases the risk of an electrical short, which occurs when two internal electrodes adjacent to each other are in contact. This may lower the reliability of the multilayer capacitor.

SUMMARY

An aspect of the present disclosure is to provide a multilayer capacitor with a reduced risk for an electrical short, which occurs when two adjacent internal electrodes make contact, while nevertheless reducing the thickness of the dielectric layers and internal electrodes, thereby improving the capacitance and reliability of the product.

According to an aspect of the present disclosure, a multilayer capacitor comprises a capacitor body and first and second external electrodes. The capacitor body includes a plurality of first and second internal electrodes alternately stacked with dielectric layers interposed therebetween. The first and second external electrodes are electrically connected to the first and second internal electrodes, respectively. First Schottky layers are at respective interfaces between the dielectric layers and the first internal electrodes. Second Schottky layers are at respective interfaces between the dielectric layers and the second internal electrodes. The work function values of the first and second Schottky layers are higher than the work function values of the first and second internal electrodes.

In an exemplary embodiment of the present disclosure, the first Schottky layers may be formed on only one of the surfaces of the first internal electrodes, and the second Shottky layers may also be formed on only one of the surfaces of the second internal electrodes.

In an exemplary embodiment of the present disclosure, the capacitor body may be formed by a repeating stacked structure in which a dielectric layer, a first internal electrode, a first Shottky layer, another dielectric layer, a second internal electrode, and a second Shottky layer are laminated.

In an exemplary embodiment of the present disclosure, the capacitor body may be formed by a repeating stacked structure in which a dielectric layer, a first Schottky layer, a first internal electrode, another dielectric layer, a second Schottky layer, and a second internal electrode are laminated.

In an exemplary embodiment of the present disclosure, the first Schottky layers may respectively cover the entirety of one surface of the first internal electrodes, and the second Schottky layer may respectively cover the entirety of one surface of the second internal electrodes.

In an exemplary embodiment of the present disclosure, the first Schottky layers may be formed on both upper and lower surfaces of the first internal electrodes, and the second Schottky layers may be formed on both upper and lower surfaces of the second internal electrodes.

In an exemplary embodiment of the present disclosure, the first Schottky layers may respectively cover the entirety of both upper and lower surfaces of the first internal electrodes, and the second Schottky layers may respectively cover the entirety of both upper and lower surfaces of the second internal electrodes.

In an exemplary embodiment of the present disclosure, the capacitor body may be formed by a repeating stacked structure in which a dielectric layer, a first Schottky layer, a first internal electrode, another first Schottky layer, another dielectric layer, a second Schottky layer, a second internal electrode, and another second Schottky layer are laminated.

In an exemplary embodiment of the present disclosure, the first and second Schottky layers may be insulating semiconductor layers.

In an exemplary embodiment of the present disclosure, the insulating layers may include at least one of molybdenum disulphide ($MoS_2$), molybdenum oxide ($MOO_x$), tungsten diselenide ($WSe_2$), cadmium telluride (CdTe), and cadmium sulfide (CdS).

In an exemplary embodiment of the present disclosure, the dielectric layer may include barium titanate ($BaTiO_3$).

In an exemplary embodiment of the present disclosure, the first and second internal electrodes may include one or more of platinum (Pt), palladium (Pd), an alloy of palladium-silver (Pd—Ag), nickel (Ni) and copper (Cu).

In an exemplary embodiment of the present disclosure, the sizes of the surfaces of the first and second Schottky layers may be equal to or larger than the sizes of the upper or lower surfaces of the first and second internal electrodes.

In an exemplary embodiment of the present disclosure, the capacitor body includes first and second surfaces opposing each other in the stacking direction, third and fourth surfaces connected to the first and second surfaces and opposing each other in the length direction, and fifth and sixth surfaces connected to the first through fourth surfaces and opposing each other in the width direction. The length direction corresponds to the direction in which the ceramic body is larger, of the two directions other than the stacking direction. The first and second internal electrodes may be exposed at the third and fourth surfaces, respectively.

In an exemplary embodiment of the present disclosure, the first and second Schottky layers may also be exposed at the third and fourth surfaces of the capacitor body, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
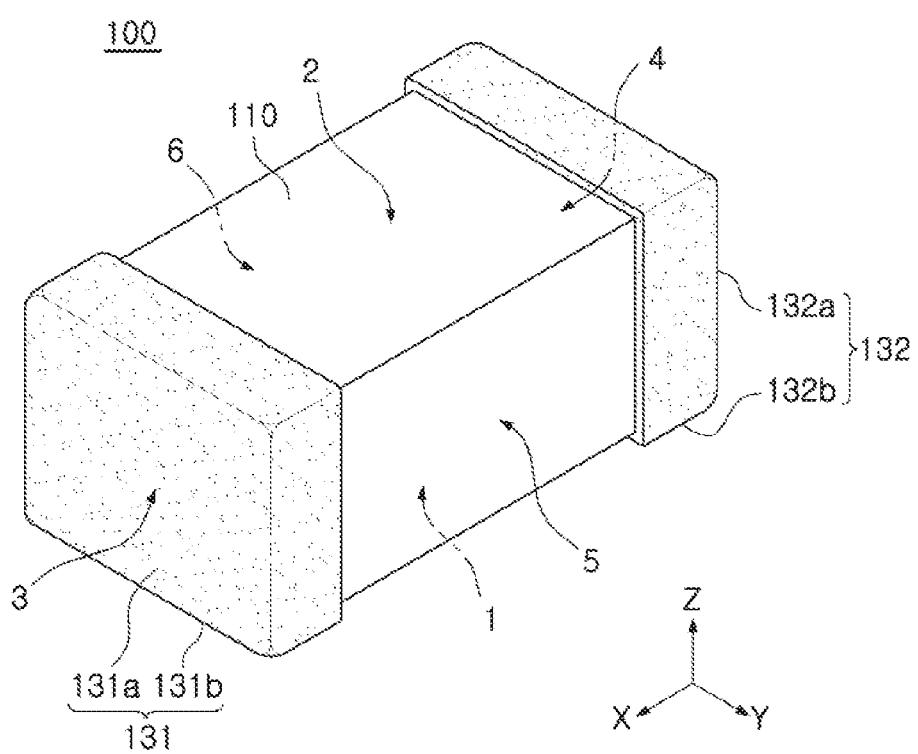
FIG. 1 is a schematic perspective view illustrating a multilayer capacitor according to an exemplary embodiment in the present disclosure.

Hereinafter, exemplary embodiments of the present disclosure will be described in detail with reference to the accompanying drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

In the drawings, the shapes and dimensions of elements may be exaggerated for clarity.

Further, in the drawings, elements having the same functions within the same scope of the inventive concept will be designated by the same reference numerals.

Hereinafter, when a direction of a capacitor body 110 is defined to clearly explain an exemplary embodiment in the present disclosure, X, Y, and Z shown in the figure represent a length direction, a width direction and a thickness direction of the capacitor body 110, respectively. Further, in the present exemplary embodiment, the Z direction may be conceptually the same as a stacking direction in which dielectric layers are laminated.

Figure 2A:
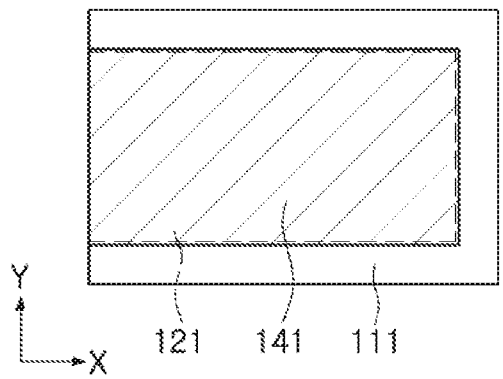
FIGS. 2A to 2B are plan views respectively illustrating Schottky layers junctioned to upper and lower surfaces of first and second internal electrodes.
Figure 2B:
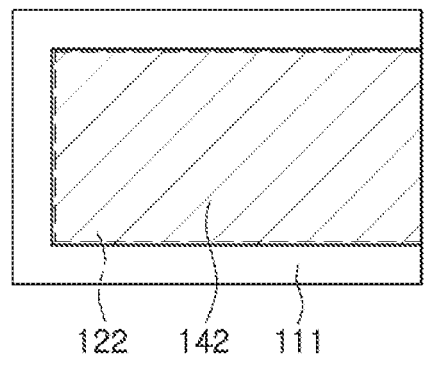
Figure 3:
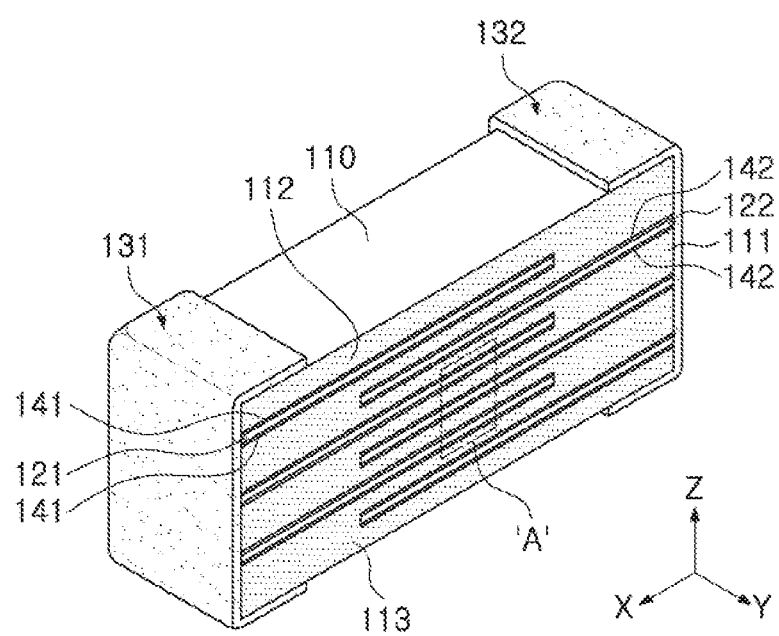
FIG. 3 is a perspective cross-sectional view illustrating a portion of FIG. 1.
Figure 4:
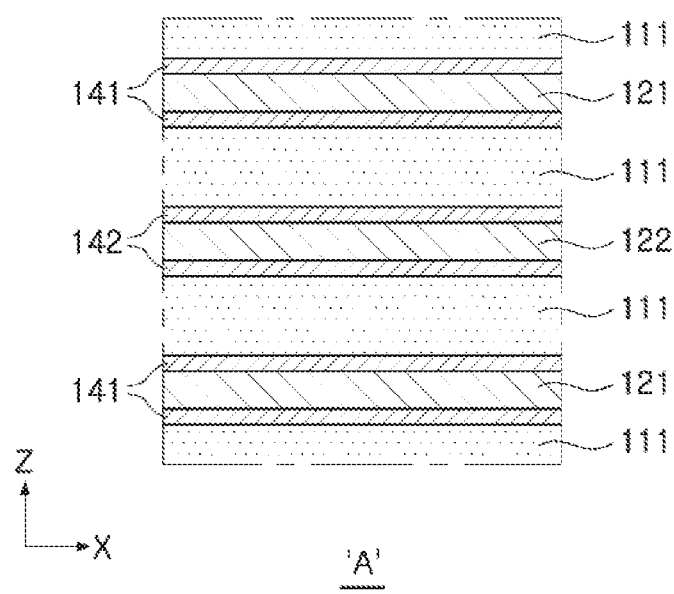
FIG. 4 is an enlarged cross-sectional view illustrating portion 'A' of FIG. 3.

FIG. 1 is a schematic perspective view illustrating a multilayer capacitor according to an exemplary embodiment in the present disclosure. FIGS. 2A to 2B are plan views respectively illustrating Schottky layers junctioned to upper and lower surfaces of the first and second internal electrodes. FIG. 3 is a perspective view illustrating a portion of FIG. 1. FIG. 4 is an enlarged cross-sectional view illustrating portion 'A' of FIG. 3.

Referring to FIGS. 1 to 4, a multilayer capacitor 100 according to the present exemplary embodiment includes a capacitor body 110, a first external electrode 131, and a second external electrode 132. The capacitor body 110 includes a first Schottky layer 141 and a second Schottky layer 142. The first and second Schottky layers have work function values higher than a work function value of an internal electrode.

The capacitor body 110 is formed by laminating a plurality of dielectric layers 111 in the Z direction and then firing the plurality of dielectric layers 111. The boundary between the adjacent dielectric layers 111 of the capacitor body 110 may be integrated, such that it may be difficult to confirm without using a scanning electron microscope (SEM).

The capacitor body 110 may have a generally hexahedral shape, but the present disclosure is not limited thereto. The shape and dimensions of the capacitor body 110, and the number of laminated dielectric layers 111, are not limited to those illustrated in the drawings of the present exemplary embodiment.

In the present exemplary embodiment, for convenience of explanation, the surfaces of the capacitor body 110 opposing each other in the Z direction are defined as a first surface 1 and a second surface 2, the surfaces connected to the first and second surfaces 1 and 2 and opposing each other in the X direction are defined as a third surface 3 and a fourth surface 4, and the surfaces connected to the first and second surfaces 1 and 2 and connected to the third and fourth surfaces 3 and 4 and opposing each other in the Y direction are defined as a fifth surface 5 and a sixth surface 6. In the present exemplary embodiment, the mounting surface of the multilayer capacitor 100 may be the first surface 1 of the capacitor body 110.

The dielectric layers 111 may include a ceramic material having a high dielectric constant, for example, a barium titanate ($BaTiO_3$) based ceramic powder, a strontium titanate ($SrTiO_3$) based ceramic powder, or the like. However, the present disclosure is not limited thereto, as long as sufficient capacitance may be obtained.

A ceramic additive, an organic solvent, a plasticizer, a binding agent, a dispersant, and the like, may further be added to the dielectric layers 111, together with the ceramic powder.

The ceramic additive may be, for example, a transition metal oxide or a transition metal carbide, a rare earth element, magnesium (Mg), aluminum (Al), or the like.

The capacitor body 110 may include an active area contributing to capacitance formation of the capacitor, and an upper cover 112 and a lower cover 113 formed respectively at the upper and lower portions of the active area in the Z direction as the upper and lower margin portions.

The upper and lower covers 112 and 113 may have the same material and configuration as the dielectric layers 111 other than not including internal electrodes.

The upper and lower covers 112 and 113 may be formed by laminating a single dielectric layer, or two or more dielectric layers, on each of the upper and lower surfaces of the active area in the Z direction. The upper and lower covers 112 and 113 may prevent damage to the first and second internal electrodes 121 and 122 due to physical or chemical stress.

The first and second internal electrodes 121 and 122 are alternately stacked in the Z direction one or more dielectric layers 111 interposed therebetween. The first and second internal electrodes can have different polarities applied, with ends exposed at the third and fourth surfaces 3 and 4 of the capacitor body 110, respectively.

The first and second internal electrodes 121 and 122 may be electrically insulated from each other by the dielectric layers 111 in between them.

The end portions of the first and second internal electrodes 121 and 122 alternately exposed at the third and fourth surfaces of the capacitor body 110 may be respectively connected to a first external electrode 131 and a second external electrode 132, which can be on the third and fourth surfaces of the capacitor body 110, respectively.

According to the above configuration, when a predetermined voltage is applied to the first and second external electrodes 131 and 132, charges are accumulated between the first and second internal electrodes 121 and 122.

The capacitance of the multilayer capacitor 100 is proportional to an overlapped area of the first and second internal electrodes 121 and 122 when viewed in the Z direction.

The material for forming the first and second internal electrodes 121 and 122 is not particularly limited. The first and second internal electrodes 121 and 122 may be formed by using for example, a noble metal material such as platinum (Pt), palladium (Pd), an alloy of palladium-silver (Pd—Ag), and the like and a conductive paste made of at least one or more of nickel (Ni) and copper (Cu).

The conductive paste may be printed by a screen printing method, a gravure printing method, or the like but the present disclosure is not limited thereto.

A first Schottky layer 141 is Schottky-junctioned to an interface between a dielectric layer 111 and a first internal electrode 121 in the capacitor body 110.

In the present exemplary embodiment, there may be two first Schottky layers 141 respectively covering the upper and lower surfaces of a first internal electrode 121 opposing each other in the Z direction.

The size of surfaces of the first Schottky layers 141 may be substantially equal to the size of the upper or lower surfaces of the first internal electrode 121 to cover the entirety of the upper or lower surface of the first internal electrode 121. The size of surfaces of the first Schottky layers 141 may alternately be larger than the size of the upper or lower surfaces of the first internal electrode 121.

An end portion of the first Schottky layer 141 may be exposed at the third surface 3 of the capacitor body 110 and be in contact with a first connection portion 131a of the first external electrode 131.

A second Schottky layer 142 is Schottky-junctioned to an interface between a dielectric layer 111 and a second internal electrode 122 in the capacitor body 110.

In the present exemplary embodiment, there may be two second Schottky layers 142 respectively covering the upper and lower surfaces of a second internal electrodes 122 opposing each other in the Z direction.

The size of surfaces of the second Schottky layers 142 may be substantially equal to the size of the upper or lower surfaces of the second internal electrode 122 to cover the entirety of the upper or lower surface of the second internal electrode 122. The size of surfaces of the second Schottky layers 142 may alternately be larger than a size of the upper or lower surfaces of the first internal electrode 121.

An end portion of the second Schottky layer 142 may be exposed at the fourth surface 4 of the capacitor body 110 and be in contact with a second connection portion 132b of the second external electrode 132.

The first and second Schottky layers 141 and 142 may have insulating properties and be formed of a material having a work function value higher than that of a metal included in the first and second internal electrodes 121 and 122. The first and second Schottky layers 141 and 142 may, for example, be formed of an insulating semiconductor layer.

The insulating semiconductor layer may be formed by using at least one of molybdenum disulfide ($MoS_2$), molybdenum oxide ($MOO_x$), tungsten diselenide ($WSe_2$), cardmule telluride (CdTe), and cadmium sulfide (CdS), and the present disclosure is not limited thereto.

The work function values of $MoS_2$, $MOO_x$, $WSe_2$, CdTe, CdS are 5.38 eV, 6.8 eV or less, 5.27 eV or less, 5.65 eV or less, and 5.87 eV or less, respectively, which are higher than the work function value of metal included in internal electrodes.

The first and second Schottky layers 141 and 142 may be inserted between the dielectric layers 111 and the first or second internal electrodes 121 and 122, respectively, by sputtering using plasma, E-beam evaporation, thermal evaporation, laser molecular beam epitaxy (L-MBE), pulsed laser deposition (PLD), and the like.

According to this structure, the capacitor body 110 of the present exemplary embodiment may be formed by repeating a laminated structure in which a dielectric layer 111, a first Schottky layer 141, a first internal electrode 121, another first Schottky layer 141, another dielectric layer 111, a second Schottky layer 142, a second internal electrode 122, and another second Schottky layer 142 are laminated.

The first and second external electrodes 131 and 132 are to be applied with voltages having different polarities. The first and second external electrodes 131 and 132 are disposed on the third and fourth surfaces 3 and 4 of the capacitor body 110, respectively, and may be respectively connected to exposed portions of the first and second internal electrodes 121 and 122.

The first and second external electrodes 131 and 132 may include conductive layers formed on the third and fourth surfaces of the capacitor body 110, respectively, and plating layers formed on the respective conductive layers.

The plating layer may include a nickel (Ni) plating layer and a tin (Sn) plating layer formed on the nickel (Ni) plating layer.

The first external electrode 131 may include a first connection portion 131a and a first band portion 131b.

The first connection portion 131a is formed on the third surface 3 of the capacitor body 110 and is connected to the first internal electrodes 121. The first band portion 131b extends on a portion of the first surface 1 of the capacitor body 110 from the first connection portion 131a.

To improve fixing strength and the like, the first band portion 131b may further extend on portions of the fifth and sixth surfaces 5 and 6 and on a portion of the second surface 2.

The second external electrode 132 may include a second connection portion 132a and a second band portion 132b.

The second connection portion 132a is formed on the fourth surface 4 of the capacitor body 110 to be connected to the second internal electrodes 122. The second band portion 132b extends on a portion of the first surface 1 of the capacitor body 110 from the second connection portion 132a.

To improve fixing strength and the like, the second band portion 132b may further extend on portions of the fifth and sixth surfaces and on a portion of the second surface 2.

In conventional multilayer capacitors, the metal component of the internal electrode has a work function value higher than the work function of the dielectric layer.

For example, the work function value of a dielectric layer with $BaTiO_3$ is 4.80 eV. The work function values of internal electrodes with Ni, Cu, Pd, or Pt are 5.20 eV, 4.82 eV, 5.41 eV, and 5.53 eV, respectively.

Figure 5:
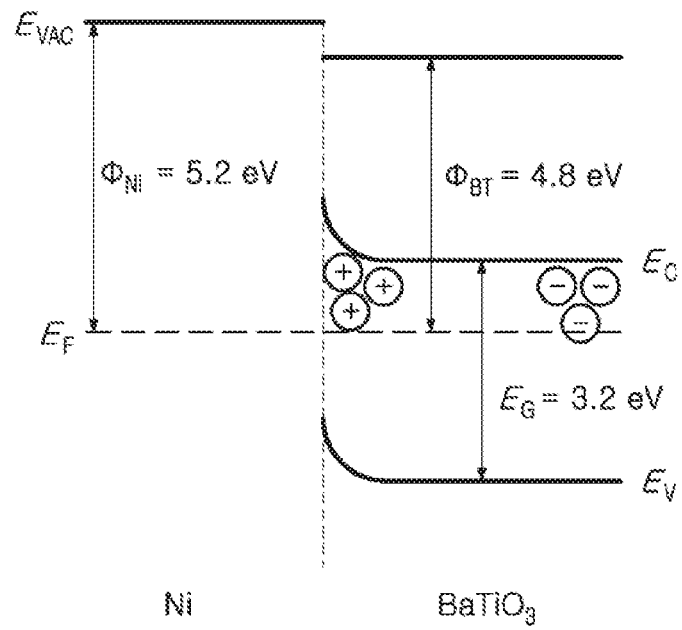
FIG. 5 is an energy band diagram between a dielectric layer and an internal electrode in a conventional multilayer capacitor.

The band diagram of FIG. 5 is an example in which the internal electrode includes nickel (Ni).

In detail, $E_{VAC}$ is a vacuum level, $E_F$ is a Fermi level, $E_C$ is a conduction band, $E_V$ is a valance band, and $E_G$ is a band gap.

Referring to FIG. 5, when internal electrodes having a relatively high work function value are junctioned to the dielectric layer, bending of a band occurs at the interface of the dielectric layer to maintain equilibrium between EFs. The bending of the band is expressed as a Schottky junction.

An energy space capable of accumulating charges is present at a Schottky barrier of this interface.

When the multilayer capacitor is operated, charges accumulate in the Schottky barrier by polarization caused by an electric field generated in the dielectric.

By improving the accumulation rate of charges of the multilayer capacitor, the capacitance of the multilayer capacitor may be improved by a certain amount.

However, in conventional multilayer capacitors, the internal resistance of the dielectric layers is lowered due to thinning and atomization of the dielectric layers, which may cause problems in securing insulating properties.

The multilayer capacitor according to an exemplary embodiment of the present disclosure may improve the insulating properties of the multilayer capacitor by controlling the interface between the dielectric layer and the internal electrode.

Thus, in the capacitor body, a Schottky layer including a semiconductor material having a high work function value at a junction of the dielectric layer and the internal electrode is disposed.

Figure 6:
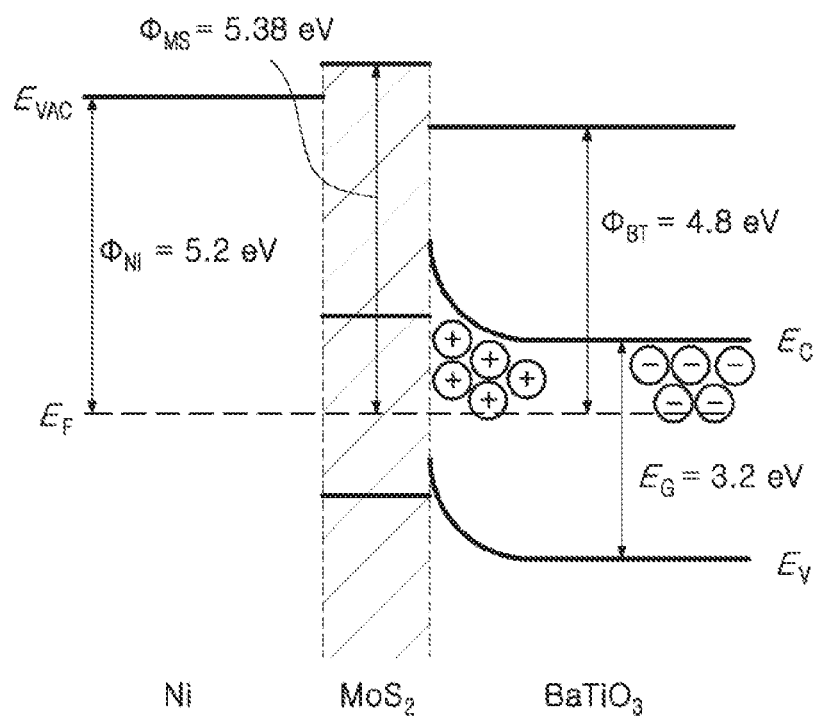
FIG. 6 is an energy band diagram between a dielectric layer, a Schottky layer and an internal electrode in a multilayer capacitor according to an exemplary embodiment in the present disclosure.

The band diagram of FIG. 6 is an exemplary embodiment of the present disclosure in which the Schottky layer includes $MoS_2$.

Referring to FIG. 6, $MoS_2$ has a higher work function value ($F_{MS}$) of 5.38 eV than nickel (Ni) of the internal electrode, thereby increasing bending of the band at the interface of the dielectric layer to significantly increase an effect of the Schottky junction.

Such a significantly increased Schottky barrier may improve the capacitance of the multilayer capacitor by accumulating relatively more charges than the multilayer capacitor using only conventional internal electrodes.

Since the materials such as $MoS_2$, or the like, used in the Schottky layer have excellent insulating properties, the insulation between adjacent internal electrodes in the capacitor body after firing may be improved.

Therefore, even when the thicknesses of the dielectric layers and internal electrodes are reduced compared with conventional multilayer capacitors, the risk of electrical shorts due to contact between adjacent internal electrodes may be reduced.

Such a structure may be applied not only to small-sized multilayer capacitors typically used in consumer electronics, but also to large-sized multilayer capacitors typically used for industrial and electrical fields.

The Schottky layer may suppress the concentration of the electric field and deterioration of the portion adjacent to the internal electrode in the capacitor body. Therefore, it will be expected that the dielectric loss of the multilayer capacitor may be reduced, long term reliability may be increased, and temperature stability may be improved. Temperature stability refers to a phenomenon in which the dielectric constant varies with temperature.

Figure 7:
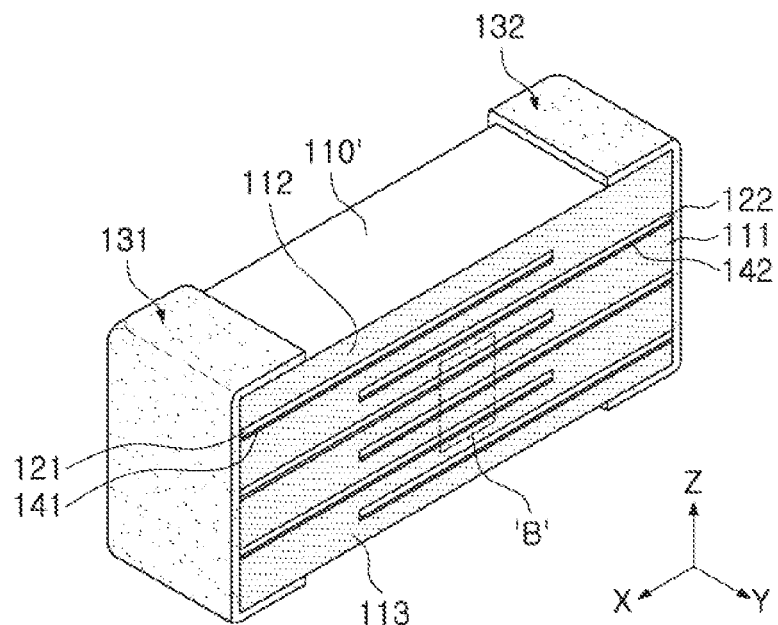
FIG. 7 is a perspective cross-sectional view illustrating a portion of a multilayer capacitor according to another exemplary embodiment in the present disclosure.
Figure 8:
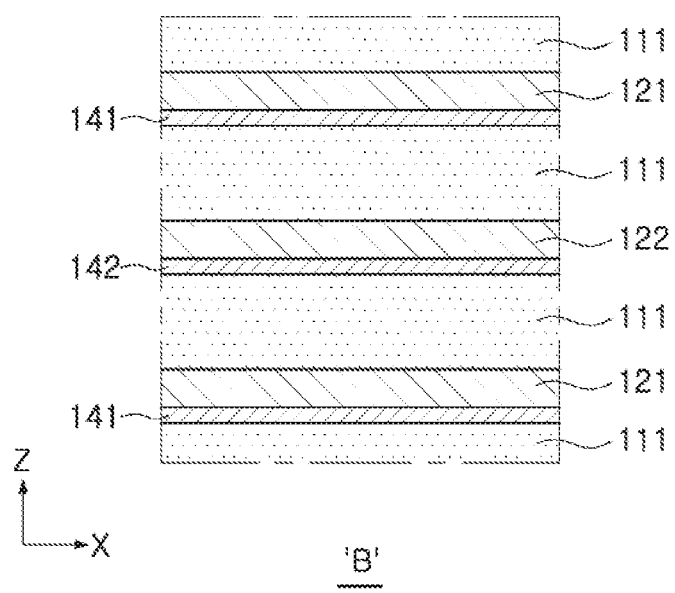
FIG. 8 is an enlarged cross-sectional view illustrating portion 'B' of FIG. 7.

FIG. 7 is a perspective view illustrating a portion of a multilayer capacitor according to another exemplary embodiment of the present disclosure. FIG. 8 is an enlarged cross-sectional view of portion 'B' of FIG. 7.

Referring to FIGS. 7 and 8, a multilayer capacitor according to another exemplary embodiment of the present disclosure may have a Schottky layer only on of the surfaces of the first and second internal electrodes 121 and 122 opposing each other in the Z direction.

Referring to FIG. 8, the capacitor body 110' may be formed by repeating a laminated structure in which a dielectric layer 111, a first internal electrode 121, a first Schottky layer 141, another dielectric layer 111, a second internal electrode 122, and a second Schottky layer 142 are laminated in the Z direction.

However, the present disclosure is not limited thereto, and, for example, the capacitor body may be formed by repeating a laminated structure in which a dielectric layer, a first Schottky layer, a first internal electrode, another dielectric layer, a second Schottky layer, and a second internal electrode are laminated. That is, according to the present exemplary embodiment, the Schottky layers may be on upper surfaces of the internal electrodes or may alternatively be on lower surfaces of the internal electrodes.

The first Schottky layer 141 may be formed to cover the entirety of the surface of the first internal electrode 121, and the second Schottky layer 142 may be formed to cover the entirety of the surface of the second internal electrode 122.

For the capacitor body illustrated in FIGS. 3 and 4, since the Schottky layer is junctioned to both surfaces of the internal electrode, even though the insulation between internal electrodes increases, the manufacturing process of the capacitor body becomes more complicated and the manufacturing process may have lowered efficiency.

In contrast, for the capacitor body shown in FIGS. 7 and 8, since the Schottky layer is only junctioned to one surface of the internal electrodes, the lamination process is relatively simpler, and the insulation between the internal electrodes is still partially reduced, so manufacturing efficiency may be improved.

As set forth above, according to the exemplary embodiments in the present disclosure, Schottky layers having a work function value higher than the work function value of the internal electrodes is on the internal electrodes so that the dielectric layer and internal electrodes can have reduced thickness and a reduced risk of electrical shorts, thereby improving the capacitance and the reliability of the multilayer capacitor.

While exemplary embodiments have been shown and described above, it will be apparent to those skilled in the art that modifications and variations could be made without departing from the scope of the present invention, as defined by the appended claims.

What is claimed is:

1. A multilayer capacitor comprising:
    a capacitor body including a plurality of first and second internal electrodes alternately stacked with dielectric layers interposed therebetween;
    a first external electrode and a second external electrode electrically connected to the first and second internal electrodes, respectively;
    a first Schottky layer at an interface between one of the plurality of first internal electrodes and one of the dielectric layers; and
    a second Schottky layer at an interface between one of plurality of second internal electrodes and another one of the dielectric layers, wherein first and second work function values of the respective first and second Schottky layers are both higher than a third work function value of the first and second internal electrodes.

2. The multilayer capacitor according to claim 1, wherein the first Schottky layer is on only one of an upper or lower surface of the one of the plurality of first internal electrodes in a stacking direction of the dielectric layer, and the second Schottky layer is on only one of an upper or lower surface of the one of the plurality of second internal electrodes in the stacking direction.

3. The multilayer capacitor according to claim 1, wherein the capacitor body is includes a repeating stacked structure including one of the dielectric layers, one of the plurality of first internal electrodes, one of a plurality of the first Schottky layer, another one of the dielectric layers, one of the plurality of second internal electrodes, and one of a plurality of the second Schottky layer, in that order.

4. The multilayer capacitor according to claim 1, wherein the capacitor body is includes a repeating stacked structure including one of the dielectric layers, one of a plurality of the first Schottky layer, one of the plurality of first internal electrodes, another one of the dielectric layers, one of a plurality of the second Schottky layer, and one of the plurality of second internal electrodes, in that order.

5. The multilayer capacitor according to claim 2, wherein the first Schottky layer covers the entirety of one surface of the one of the plurality of first internal electrodes, and the second Schottky layer covers the entirety of one surface of the one of the plurality of second internal electrodes.

6. The multilayer capacitor according to claim 1, wherein two of the first Schottky layer are on the respective upper and lower surfaces of the one of the plurality of first internal electrodes in a stacking direction of the dielectric layer, and two of the second Schottky layer are on the respective upper and lower surfaces of the one of the plurality of second internal electrodes in the stacking direction.

7. The multilayer capacitor according to claim 6, wherein the two of the first Schottky layer respectively cover the entirety of the upper and lower surfaces of the one of the plurality of first internal electrodes, and the two of the second Schottky layer respectively cover the entirety of the upper and lower surfaces of the one of the plurality of second internal electrodes.

8. The multilayer capacitor according to claim 1, wherein the capacitor body is includes a repeating stacked structure including one of the dielectric layers, one of a plurality of the first Schottky layer, the one of the plurality of first internal electrodes, another one of the plurality of the first Schottky layer, another one of the dielectric layers, one of a plurality of the second Schottky layer, the one of the plurality of second internal electrodes, and another one of the plurality of the second Schottky layer, in that order.

9. The multilayer capacitor according to claim 1, wherein the first and second Schottky layers are insulating semiconductor layers.

10. The multilayer capacitor according to claim 9, wherein the insulating semiconductor layers comprise at least one of molybdenum disulphide ($MoS_2$), molybdenum oxide ($MoO_x$), tungsten diselenide ($WSe_2$), cadmium telluride (CdTe), and cadmium sulfide (CdS).

11. The multilayer capacitor according to claim 1, wherein the dielectric layers comprise barium titanate ($BaTiO_3$).

12. The multilayer capacitor according to claim 1, wherein the first and second internal electrodes comprise one or more of platinum (Pt), palladium (Pd), an alloy of palladium-silver (Pd—Ag), nickel (Ni) and copper (Cu).

13. The multilayer capacitor according to claim 1, wherein first and second sizes of the upper or lower surfaces of the respective first and second Schottky layers are both equal to or larger than a third size of upper or lower surfaces of the first or second internal electrodes.

14. The multilayer capacitor according to claim 1,
wherein the capacitor body comprises a first surface and a second surface opposing each other in a stacking direction, a third surface and a fourth surface connected to the first and second surfaces and opposing each other in a length direction substantially perpendicular to the stacking direction, and a fifth surface and a sixth surface connected to the first and second surfaces and to the third and fourth surfaces and opposing each other in a width direction substantially perpendicular to the stacking and length directions,
wherein a length of the ceramic body, in the length direction, is larger than a width of the ceramic body in the width direction, and
wherein the first and second internal electrodes are exposed at the third and fourth surfaces, respectively.

15. The multilayer capacitor according to claim 14, wherein the first and second Schottky layers are exposed at the third and fourth surfaces of the capacitor body, respectively.

16. A multilayer capacitor comprising:
an active area, including a plurality of first and second internal electrodes, a plurality of dielectric layers, and a plurality of Schottky layers, with the plurality of Schottky layers respectively interposed between dielectric layers and internal electrodes of the plurality of first and second internal electrodes;
an upper cover including one or more dielectric layers above an upper surface of the active area in a stacking direction;
a lower cover including one or more dielectric layers below a lower surface of the active area in the stacking direction;
a first external electrode connection portion on a first side surface, substantially parallel to the stacking direction, of the active area, upper cover, and lower cover, and electrically connected to the first internal electrodes;
a second external electrode connection portion on a second side surface, substantially parallel to the stacking direction and opposing the first side surface, of the active area, upper cover, and lower cover, and electrically connected to the second internal electrodes,
wherein the Schottky layers have a first work function value, the plurality of first and second internal electrodes have a second work function value, and the first work function value is greater than the second work function value.

17. The multilayer capacitor of claim 16, wherein both sides, in the stacking direction, of each of the plurality of first and second internal electrodes are in contact with respective Schottky layers of the plurality of Schottky layers.

18. The multilayer capacitor of claim 16, wherein the plurality of Schottky layers comprise at least one of molybdenum disulphide ($MoS_2$), molybdenum oxide ($MoO_x$), tungsten diselenide ($WSe_2$), cadmium telluride (CdTe), and cadmium sulfide (CdS).

19. The multilayer capacitor of claim 16, wherein the plurality of Schottky layers have respective first areas, perpendicular to the stacking direction, that are equal to or larger than respective second areas, perpendicular to the stacking direction, of the plurality of first and second internal electrodes.

20. A multilayer capacitor comprising:
a plurality of stacked structures, each stacked structure including, in order, a first dielectric layer with a first work function value, a first insulating layer with a second work function value, a first internal electrode with a third work function;
external electrodes electrically connected to respective internal electrodes of the repeated stacked structure,
wherein the third work function value is greater than the first work function value, and the second work function value is greater than the third work function value.

21. The multilayer capacitor of claim 20, wherein each stacked structure further includes a second insulating layer with the second work function value in order after the first internal electrode.

22. The multilayer capacitor of claim 20, wherein the first insulating layer comprises at least one of molybdenum disulphide ($MoS_2$), molybdenum oxide ($MoO_x$), tungsten diselenide ($WSe_2$), cadmium telluride (CdTe), and cadmium sulfide (CdS).

23. The multilayer capacitor of claim 20, wherein the first insulating layer has a first area, perpendicular to a stacking direction of the plurality of stacked structures, that is equal to or larger than a second area of the first internal electrode perpendicular to the stacking direction.

* * * * *